United States Patent
Bunyer et al.

(10) Patent No.: US 7,395,724 B2
(45) Date of Patent: Jul. 8, 2008

(54) TORQUE SENSOR PACKAGING SYSTEMS AND METHODS

(75) Inventors: Scott L. Bunyer, Freeport, IL (US); Fred W. Hintz, Freeport, IL (US); Steven J. Magee, Lena, IL (US); Randall J. Hasken, Lanark, IL (US); James Z T Liu, Hudson, NH (US); Gary R. O'Brien, Riverview, MI (US); James D. Cook, Freeport, IL (US); Richard M. Andrews, Freeport, IL (US); Stephen R. Shiffer, Xenia, OH (US)

(73) Assignee: Honeywell International Inc., Morristown, NJ (US)

( * ) Notice: Subject to any disclaimer, the term of this patent is extended or adjusted under 35 U.S.C. 154(b) by 122 days.

(21) Appl. No.: 11/210,198

(22) Filed: Aug. 22, 2005

(65) Prior Publication Data
US 2007/0039396 A1 Feb. 22, 2007

(51) Int. Cl.
*G01L 3/02* (2006.01)
(52) U.S. Cl. ............. 73/862.339; 73/862.338
(58) Field of Classification Search ............ 73/862.339, 73/862.337, 819
See application file for complete search history.

(56) References Cited

U.S. PATENT DOCUMENTS

| | | | | |
|---|---|---|---|---|
| 2,694,627 A * | 11/1954 | Haupt et al. | ................... | 420/92 |
| 4,196,337 A | 4/1980 | Jewett et al. | .......... | 219/121 EM |
| 4,750,371 A | 6/1988 | Kobayashi et al. | ....... | 73/862.36 |
| 4,823,606 A | 4/1989 | Malicki | | |
| 5,146,790 A | 9/1992 | Fish | ..................... | 73/862.336 |
| 5,585,571 A * | 12/1996 | Lonsdale et al. | ....... | 73/862.325 |
| 5,703,298 A | 12/1997 | Odachi et al. | | |
| 5,770,936 A * | 6/1998 | Hirai et al. | .................. | 318/538 |
| 5,831,180 A | 11/1998 | Tanaka et al. | | |
| 6,076,409 A * | 6/2000 | Bang | ........................... | 73/756 |
| 6,442,812 B1 * | 9/2002 | Kovacich et al. | ........... | 29/25.35 |
| 6,532,833 B1 * | 3/2003 | Lec | ........................ | 73/862.338 |
| 6,581,478 B2 * | 6/2003 | Pahl et al. | ............... | 73/862.326 |
| 6,621,379 B1 * | 9/2003 | Goetz et al. | .................. | 333/193 |
| 6,895,828 B2 | 5/2005 | Nakatani et al. | ....... | 73/862.331 |
| 7,095,198 B1 * | 8/2006 | O'Brien | ...................... | 318/432 |
| 2003/0000309 A1 * | 1/2003 | Lonsdale et al. | ............. | 73/650 |
| 2003/0200814 A1 * | 10/2003 | Oh et al. | ....................... | 73/779 |
| 2005/0017602 A1 * | 1/2005 | Arms et al. | ................... | 310/339 |
| 2005/0022614 A1 | 2/2005 | Naruse et al. | .......... | 73/862.326 |
| 2005/0028613 A1 | 2/2005 | Onoda et al. | ........... | 73/862.331 |

(Continued)

FOREIGN PATENT DOCUMENTS

DE 10138513 A1 2/2003

(Continued)

*Primary Examiner*—Edward Lefkowitz
*Assistant Examiner*—Punam Patel
(74) *Attorney, Agent, or Firm*—Richard H. Krukar; Luis M. Ortiz; Kermit D. Lopez

(57) ABSTRACT

A torque sensor packaging system and method includes a torque member that includes one or more holes formed therein for receiving one or more respective fasteners associated with a sensing element. The sensing element can be connected to the torque member to the sensing element in order to transfer torque associated with the torque member to the sensing element for torque sensing operations thereof.

10 Claims, 8 Drawing Sheets

U.S. PATENT DOCUMENTS

| | | | |
|---|---|---|---|
| 2005/0103127 A1 | 5/2005 | Yang | 73/862.334 |
| 2005/0126309 A1 | 6/2005 | Nakane et al. | 73/862.331 |
| 2005/0160835 A1 | 7/2005 | Masaki et al. | 73/862.333 |
| 2005/0166685 A1 | 8/2005 | Boiten | 73/862.191 |
| 2005/0194185 A1* | 9/2005 | Gleitman | 175/45 |
| 2006/0284583 A1* | 12/2006 | Andrews et al. | 318/432 |
| 2007/0028692 A1* | 2/2007 | Liu | 73/584 |
| 2007/0030134 A1* | 2/2007 | Liu et al. | 340/441 |

FOREIGN PATENT DOCUMENTS

| | | | |
|---|---|---|---|
| GB | 2370640 A | * | 7/2002 |
| GB | 2387911 A | * | 10/2003 |
| GB | 2397379 A | * | 7/2004 |
| JP | 2004301508 | | 10/2004 |
| WO | WO 03034013 A1 | * | 4/2003 |

* cited by examiner

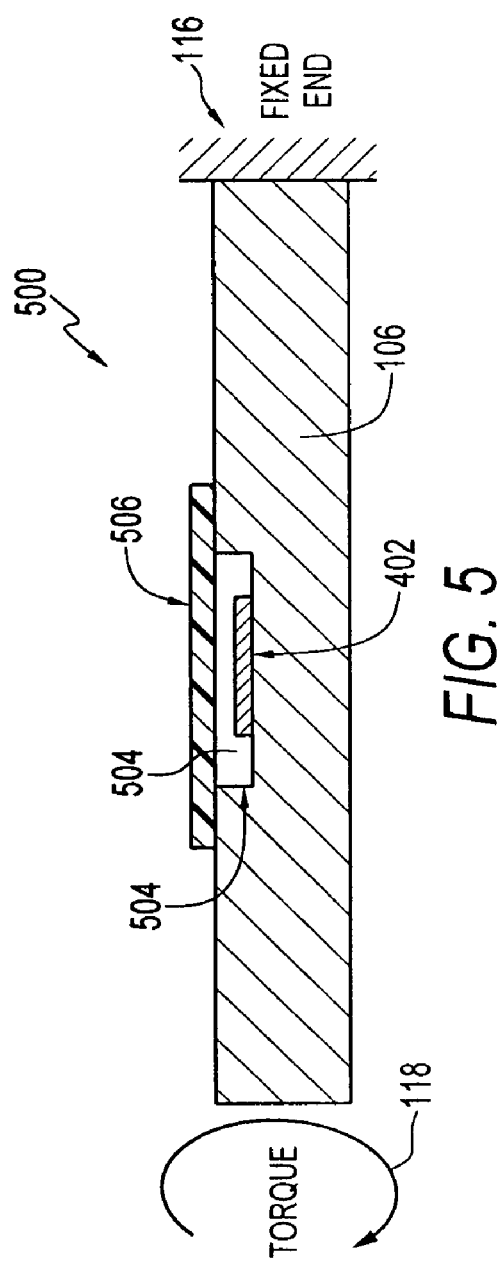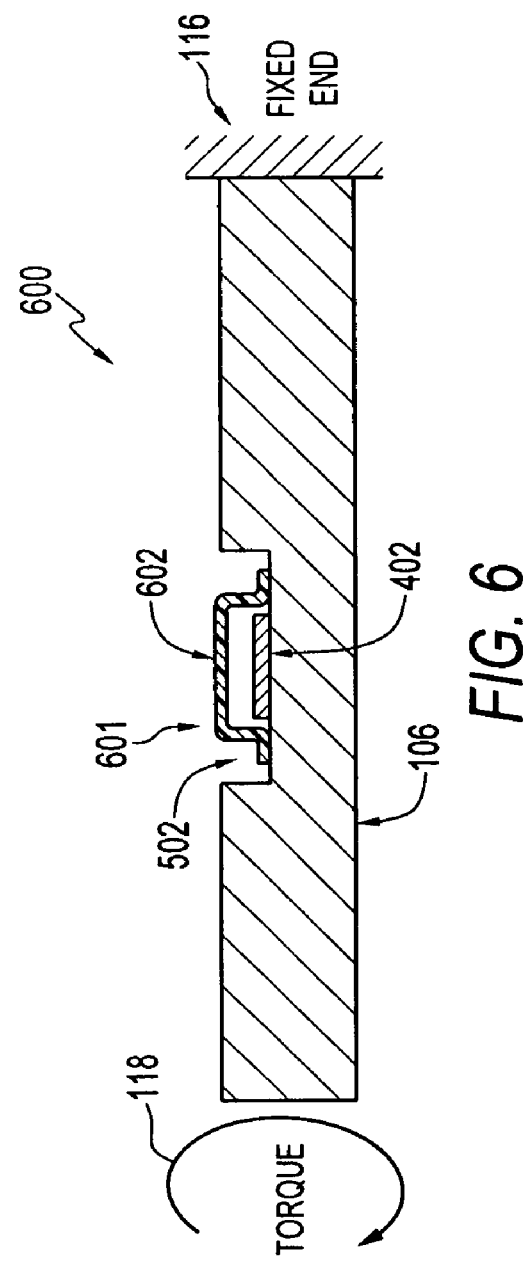

TORQUE SENSOR PACKAGING SYSTEMS AND METHODS

TECHNICAL FIELD

Embodiments are generally related to sensor methods and systems. Embodiments are also related to torque sensors. Embodiments additionally relate to systems for packaging torque sensors for torque sensing applications.

BACKGROUND

In systems incorporating rotating drive shafts, it is often necessary to know the torque and speed of such shafts in order to control the same or other devices associated with the rotatable shafts. Accordingly, it is desirable to sense and measure the torque in an accurate, reliable, and inexpensive manner.

Sensors to measure the torque imposed on rotating shafts, such as but not limited to shafts in automotive vehicles, are utilized in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Prior methods for obtaining torque measurement in such systems have been accomplished through the use of contact-type sensors directly attached to the shaft being rotated. For example, one such type of sensor is a "strain gauge" type torque detection apparatus, in which one or more strain gauges are directly attached to the outer peripheral surface of the shaft and the applied torque is measured by detecting a change in resistance, which is caused by applied strain and is measured by a bridge circuit or other well-known means.

Another type of sensor used is a non-contact torque sensor wherein magnetorestrictive materials are disposed on rotating shafts and sensors are positioned to detect the presence of an external flux which is the result of a torque being applied to the magnetorestrictive material.

Such magnetostrictive materials require an internal magnetic field which is typically produced or provided by either pre-stressing the magnetostrictive material by using applied forces (e.g., compressive or tensile) in either a clockwise or counter clockwise to pre-stress the coating prior to magnetization of the pre-stressed coating in order to provide the desired magnetic field. Alternatively, an external magnet or magnets can be provided to produce the same or a similar result to the magnetostrictive material. In a further alternative, torque may be measured utilizing what is known as the magneto-elastic phenomenon; that is, to take advantage of this phenomenon in the context of a resonate sensor. In such a situation, the resonator frequency of a free-standing magneto-elastic sensor changes with strain.

To this end, magnetostrictive torque sensors have been provided wherein a sensor is positioned in a surrounding relationship with a rotating shaft, with an air gap being established between the sensor and shaft to allow the shaft to rotate without rubbing against the sensor. A magnetic field is generated in the sensor by passing electric current through an excitation coil of the sensor. This magnetic field permeates the shaft and returns back to a pick-up coil of the sensor.

The output of the pick-up coil is an electrical signal that depends on the total magnetic reluctance in the above-described loop. Part of the total magnetic reluctance is established by the air gap, and part is established by the shaft itself, with the magnetic reluctance of the shaft changing as a function of torque on the shaft. Thus, changes in the output of the pick-up coil can be correlated to the torque experienced by the shaft.

Regardless of the specific type of torque sensor utilized, torque sensing is required in automotive applications to provide direct torque measurements to engine or transmission control units. One of the problems with prior art torque sensors is that such devices are typically limited in their ability to provide direct torque measurements to engine and transmission control units. In most prior art systems, for example, the torque sensor package is not typically connected directly to the rotating or torque member due to difficulties in packaging designs. It is therefore believed that a solution to these problems lies in the design and implementation of an improved packaging system and methodology as disclosed in greater detail herein.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for improved sensor methods and systems.

It is another aspect of the present invention to provide for an improved packaging system and method for a torque sensor.

The aforementioned aspects of the invention and other objectives and advantages can now be achieved as described herein. A torque sensor packaging system and method are disclosed. In general, a torque member can be provided that includes one or more holes formed therein for receiving one or more respective fasteners associated with a sensing element. The sensing element can be connected to the torque member in order to transfer torque associated with the torque member to the sensing element for torque sensing operations thereof.

The sensing element can be provided as a transducer. A torque sensor package can be integrated with the sensing element, wherein the torque sensor package is configured to include the holes for receiving the respective fasteners for connection of the torque sensor package to the torque member. The fasteners can be provided as, for example, a plurality of rivets for connecting the torque sensor package to the torque member through the respective holes. The fasteners can alternatively be provided as a plurality of screws for connecting the torque sensor package to the torque member through a respective hole. The fastener can also be configured in the context of a plurality of external threads formed from and onto the torque sensor package for connecting the torque sensor package to the torque member through a tapped hole formed from the torque member.

The torque sensor package can alternatively be configured to include a flange connected to the sensing element and an adhesive for securing the flange and hence, the torque sensor package to the torque member. The sensing element can be implemented in the context of, for example, a Surface Acoustic Wave (SAW) die, wherein the SAW die generates an electrical output that is proportional to the torque induced on the torque member. An adhesive can be utilized to secure the SAW die directly to the torque member at a location of the torque member wherein a maximum amount of torque information is available, such that the adhesive is tolerant to an environment in which the adhesive is utilized to mount the SAW die to the torque member.

Note that as utilized herein the term "SAW" generally refers to surface acoustic wave sensing technology. SAW torque sensing is a technology that can be adapted for use with automotive, transportation, rail, and other similar segments in, for example, powertrain and chassis applications. SAW devices are resonators whose resonant frequency changes when they are strained. Working at radio frequencies, such SAW devices can be wirelessly excited with an interrogation pulse and a resonant response measured allowing strain to be calculated. Torque can be sensed using a sensing element such as a SAW die by using appropriate packaging and algorithms to deduce the value of a sensed property from a returned signal.

Alternatively, a metal patch can be provided and the hole formed within the torque member configured as a blind hole such that the metal patch covers the blind hole. In such a scenario, the sensing element can be provided as a SAW die located within the blind hole and connected to the torque member and covered by the metal patch. Additionally, the transducer package can include the use of a ½ button transducer package cover.

A low friction spacer can also be provided, which includes a flat low friction surface that maintains contact with a second coupler. The sensing element can thus be associated with a coupler for the wireless transmission of data from the sensing element. The coupler can be implemented in the context of a Printed Circuit Board (PCB) or an impregnated plastic component that includes a plurality of holes through which a plurality of respective fasteners are driven into the torque member.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

FIG. 5 illustrates cross-sectional view of a torque sensor system, which can be implemented in accordance with an alternative embodiment;

FIG. 6 illustrates cross-sectional view of a torque sensor system, which can be implemented in accordance with an alternative embodiment;

DETAILED DESCRIPTION

The particular values and configurations discussed in these non-limiting examples can be varied and are cited merely to illustrate at least one embodiment and are not intended to limit the scope of the invention.

Figure 1:
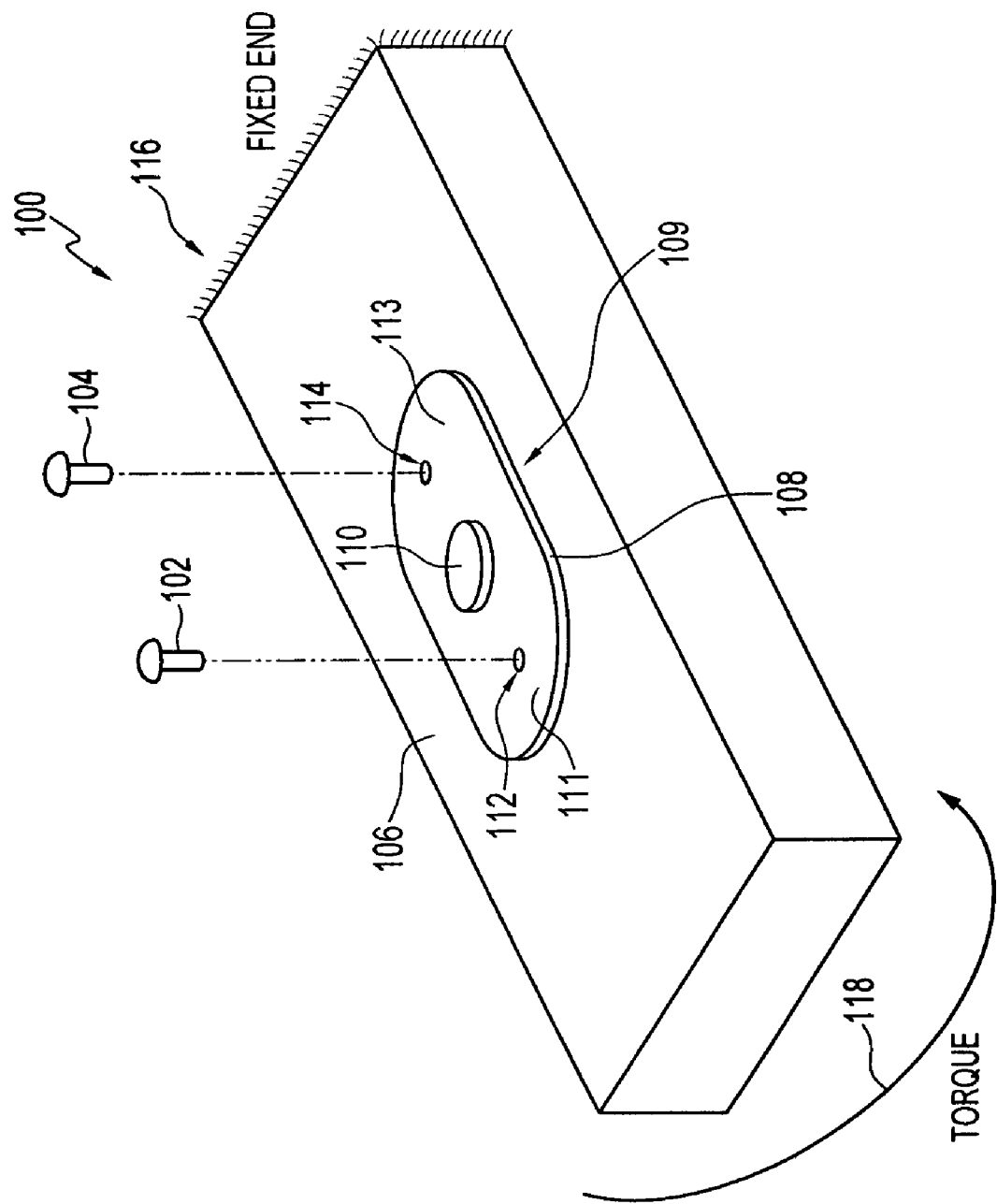
FIG. 1 illustrates a perspective, pictorial view of a torque sensor system, which can be implemented in accordance with a preferred embodiment.

FIG. 1 illustrates a perspective, pictorial view of a torque sensor system 100, which can be implemented in accordance with a preferred embodiment. Note that in FIGS. 1-9 herein, identical or similar parts or elements are generally indicated by identical reference numerals. Torque sensor system 100 can be utilized to solve the need in automotive applications for providing direct torque measurements to engine and/or transmission control units. Torque sensor system 100 generally includes a torque member 106, which can be for example, a bar, a shaft, a flange, or any mechanism with torque applied, such as torque 118 depicted in FIG. 1.

Torque member 106 generally includes a fixed end 116, which is fixed to another mechanism or object. A torque sensor transducer package 109 can be located on and connected to the torque member 106 utilizing connectors 102, 104, which may be provided as, for example, screws or rivets, depending upon design considerations. Integrated with or affixed to the torque sensor transducer package 109 is a transducer or sensing element 110. Note that the torque sensor transducer package 109 can be configured to include holes 112, 114, which respectively receive respective fasteners or connectors 102, 104, which are subsequently connected directly to the torque member 106 through holes 112, 114.

The torque sensor transducer package 109 is therefore securely fastened to the torque member 106 so that the torque 118 or twist is transferred from the torque member 106 to the transducer or sensing element 110. Fasteners or connectors 102, 104 are thus utilized to attach the torque sensor transducer package 109 to the torque member 106. Note that the configuration of system 100 can be modified such that the torque sensor transducer package 109 comprises flange portions 111, 113 on both sides thereof. Such flange portions 111, 113 together form an oval-shaped flange 108, which can also function as a base upon which the transducer or sensing element 110 can be placed. Each flange portion 111, 113 can configured to include or incorporate respect holes 112, 114 so that a respective screw or rivet, such as, for example, respective screws or rivets 102, 104 can be driven into the torque member 106. Such fasteners 102, 104, may or may not be provided with an adhesive on their threads to ensure that such fasteners do not become loose. In any event, system 100 results in securely attaching the torque sensor transducer package 109 to the torque member 106.

The torque sensor transducer package 109 can be formed from a variety of materials. For example, the torque sensor transducer package 109 can be stamped, turned, cast-molded, and so forth. The holes 112, 114 in flange portions 111, 113 can be configured during the primary fabrication of the torque sensor transducer package 109 or can be placed there with a secondary operation. The torque sensor transducer package 109 can then be attached to the torque member 106 with screws or rivets 102, 104.

Figure 2:
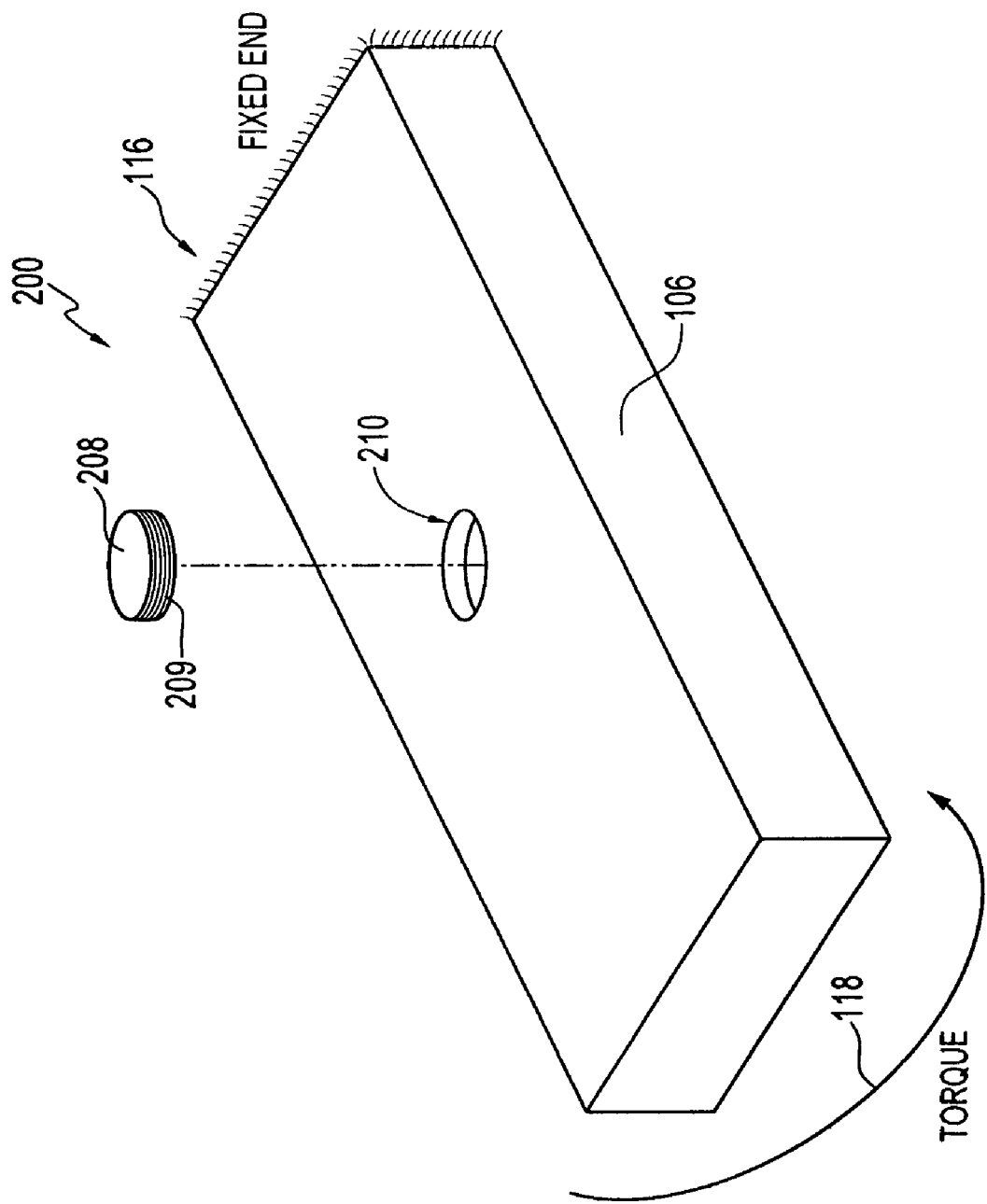
FIG. 2 illustrates a perspective, pictorial view of a torque sensor system, which can be implemented in accordance with an alternative embodiment.

FIG. 2 illustrates a perspective, pictorial view of a torque sensor system 200, which can be implemented in accordance with an alternative embodiment. Note that torque sensor system 200 essentially represents an alternative implementation of the torque sensor system 100 depicted in FIG. 1. In generally torque sensor system 100 includes torque member 106, which can be subject to torque 118. A tapped hole 210 can be formed into the torque member 106. A torque sensor transducer package 208 with external threads 209 can then be placed and secured into the tapped hole 210, which is configured to engage and receive external threads 209 of the package 208.

The torque sensor transducer package 208 can thus be securely fastened to the torque member 106 so that the torque 118 or twist is transferred from the torque member 106 to the transducer or transducer package 208. Transducer 208 is therefore threaded and screwed into the tapped hole 210 of the torque member 106. The threads 208 of the transducer or transducer package 208 may or may not include adhesives to ensure that the package 208 does not become loose. Note that the transducer package 208 can be formed from a variety of materials and maybe stamped, turned, cast, molded, and so forth during its formation. The threads 209 may be formed during a primary fabrication step of the package 208 or during a secondary operation. The package 208 can then be attached to the torque member 106 by screwing the package 208 into the torque member 106.

Figure 3:
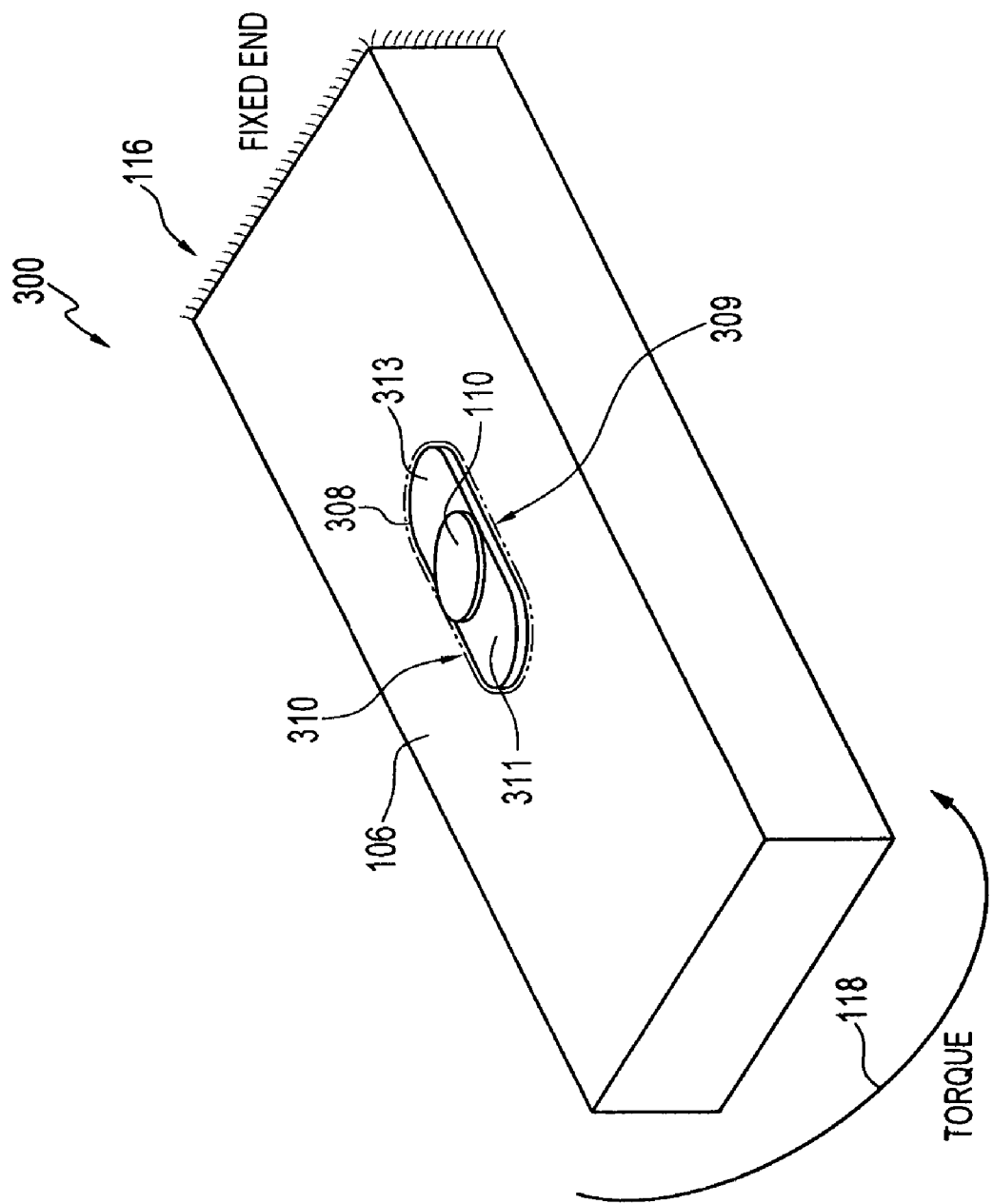
FIG. 3 illustrates a perspective, pictorial view of a torque sensor system, which can be implemented in accordance with an alternative embodiment.

FIG. 3 illustrates a perspective, pictorial view of a torque sensor system 300, which can be implemented in accordance with an alternative embodiment. Note that torque sensor system 300 essentially represents an alternative implementation of the torque sensor system 100 depicted in FIG. 1 and/or the torque sensor system 200 depicted in FIG. 2. Again, as a reminder, identical or similar parts or elements are indicated in FIG. 1-9 by identical reference numerals. Torque sensor system 300 includes the torque member 106, which can be subject to torque 118. Torque member 116 includes a fixed end 116. A torque sensor transducer package 309 is generally configured to include a base or flange 308 upon which the sensing element 110 is located. Note that the base or flange 308 depicted in FIG. 3 is similar to the base or flange 108 depicted in FIG. 1 and includes flange portions 311, 313, which are similar to respective flange portions 111, 113 illustrated in FIG. 1.

As indicated previously, the transducer package 309 must be securely fastened to the torque member 106 so that the torque 118 or twist is transferred from the torque member 106 to the transducer or sensing element 110. Transducer package 309 can therefore be configured to include a base or flange 308 with flange portions 311, 313 on both sides of the base of flange 308. Each flange portion 311, 313 can therefore provide respective surface areas for an adhesive 310 to securely fasten the transducer package 309 to the torque member 106.

Note that the transducer package 309 can be formed from a variety of materials and maybe stamped, turned, cast, molded, and so forth during its formation. The adhesive 310 can be applied to the flange 308 and/or the torque member 106. Such an adhesive 310 may require a heat cure, an RF (Radio Frequency) cure, a time cure, and so forth, depending upon the needs and considerations of the manufacturing process.

Figure 4:
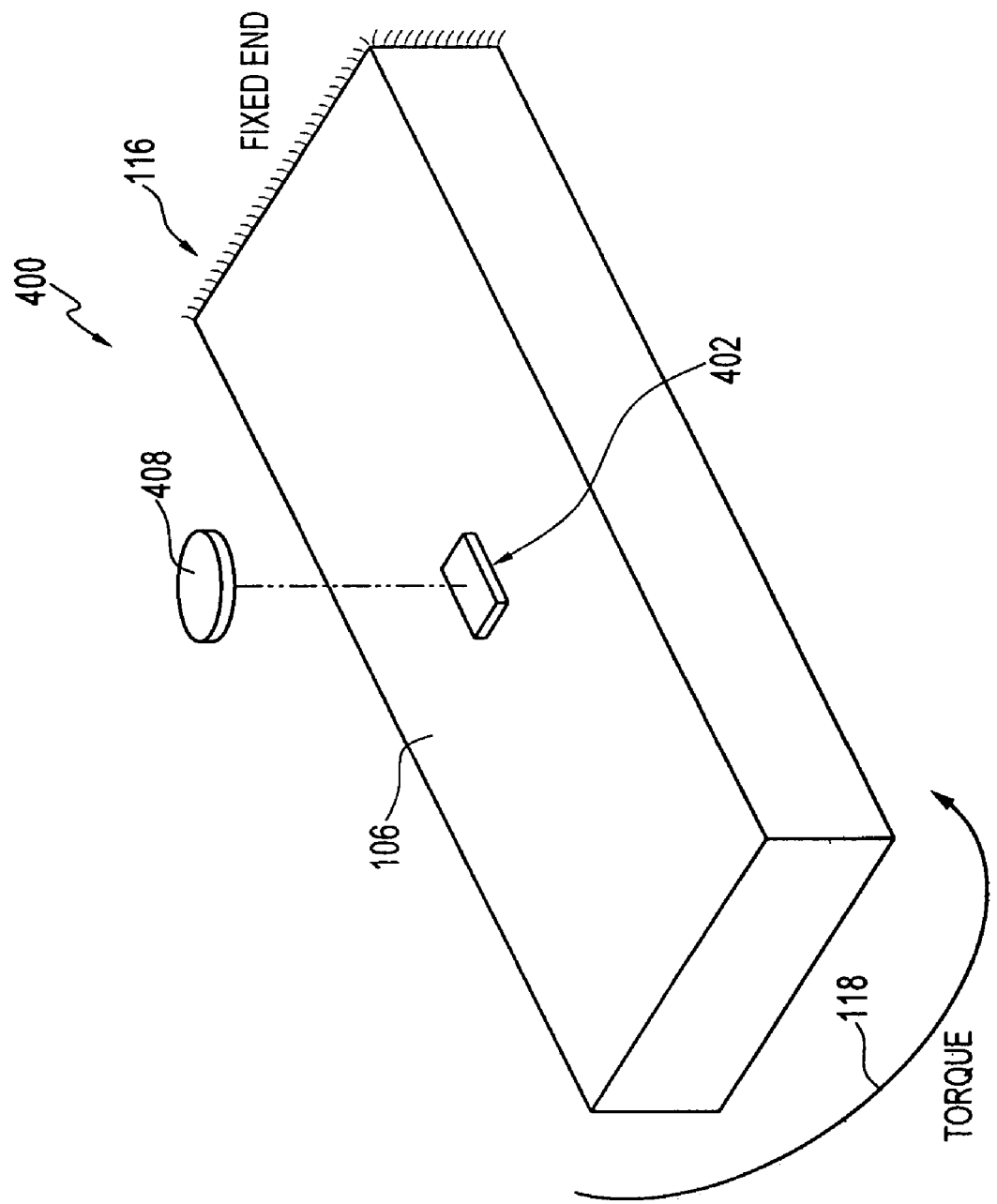
FIG. 4 illustrates a perspective, pictorial view of a torque sensor system, which can be implemented in accordance with an alternative embodiment.

FIG. 4 illustrates a perspective, pictorial view of a torque sensor system 400, which can be implemented in accordance with an alternative embodiment. Note that torque sensor system 400 essentially represents an alternative implementation of the torque sensor systems 100-300 respective depicted in FIGS. 1-3. System 400 includes torque member 106, which can be subject to a torque 118. A sensing element 402, in this case a Surface Acoustic Wave (SAW) chip can be connected to the torque member 106. The sensing element 402 can be configured as a chip or sensing die, such that the sensing element or die 402 is affixed directly to the torque member 106.

Note that torque member 106 can be, for example, a fly wheel or a flex plate, depending upon design considerations and applications thereof. System 400 therefore describes a methodology of direct measurement of torque 118 induced in torque member 106 (e.g., fly wheel, flex plate, etc.) by affixing the sensing die or sensing element 402 to the torque member 106. Additionally, a cover 408 can be provided to surround, maintain and protect the sensing element 402.

Sensing element 402 can function as a SAW torque sensor. The application of such a SAW torque sensor provides an electrical output that is proportional to the torque 118 induced on or form the torque member 106. Transfer of torque information to the sensing element 402 (e.g., a sensing integrated circuit) can be achieved by adhering the sensing die or element 402 to an area of the torque member 106 in which the most torque or information is available. The die 402 can be attached to the torque member 106 using an adhesive (e.g., adhesive 310) that is tolerant to the environment in which it is mounted. Such an environment can include, but is not limited to, one which includes transmission oil, motor oil, grease, salt water, vibration and/or mechanical shock. Note that the use of cover 408 is important because the SAW device or sensing element 402 utilized is generally very sensitive to any loading on its surface. Even changes in humidity may be detected utilizing the sensing configuration described herein. Thus cover 408 can be implemented as, for example, a cover that provides a hermetically sealed environment.

FIG. 5 illustrates a cross-sectional view of a torque sensor system 500, which can be implemented in accordance with an alternative embodiment. Note that torque sensor system 500 essentially represents an alternative implementation of the torque sensor systems 100-400 respective depicted in FIGS. 1-4. Torque sensor system 500 generally includes a torque member 106 having the fixed end 116 illustrated previously. The torque member 106 can be subject to the induced torque 118, also depicted and described previously. Torque sensor system 500 can be configured to include a gap 502 in which the sensing element 402 is located. As indicated previously, sensing element 402 can be implemented as a SAW chip or SAW die. A metal patch is generally located above the gap 502. Gap 502 generally functions as a counter sink 504 for system 500.

The sensing element 402 can itself function as a transducer package, which is securely fastened to the torque member 106 so that the torque 118 or twist is transferred from the torque member 106 to the transducer or sensing element 402. The transducer package or sensing element 402 is therefore placed in gap 502, which is formed as a blind hole in torque member 106. The transducer package or sensing element 402 can be held in the hole or gap 502 with the metal patch 506 located thereabove. The metal patch 506 can be held down by laser welding, epoxy or another appropriate connecting method or mechanism.

FIG. 6 illustrates a cross-sectional view of torque sensor system 600, which can be implemented in accordance with an alternative embodiment. Note that torque sensor system 600 essentially represents an alternative implementation of the torque sensor systems 100-500 respective depicted in FIGS. 1-5. Torque sensor system 600 generally includes the torque member 106 and its fixed end 116. Torque member 106 can be subject to the induced torque 118. The sensing element 402 (e.g., SAW chip or SAW die) is located in gap 502 and is generally connected to torque member 106.

The sensing element 402 generally functions as a transducer as part of a transducer package 601. Such a transducer package 601 must be securely fastened to the torque member 106 to that the torque 118 or twist is transferred from the torque member 106 to the transducer or sensing element 402. The transducer or sensing element 402 can be protected and maintained within the gap 502 formed within the torque member 106 by a ½ button transducer package cover or component 602. The sensing element 402 is thus covered by the ½ button transducer package cover or component 602. Gap 502 is thus formed as a blind hole from torque member 106. The ½ button transducer package cover or component 602 together with the sensing element or transducer 402 for the transducer package 601, which can be placed into the hole or gap 502 "upside down" so that the transducer or sensing element 402 is protected on one side by the blind hole 502 and other side by the transducer package 601 itself. The transducer package 602 can be held in place with a connecting means such as, for example, an epoxy.

Figure 7:
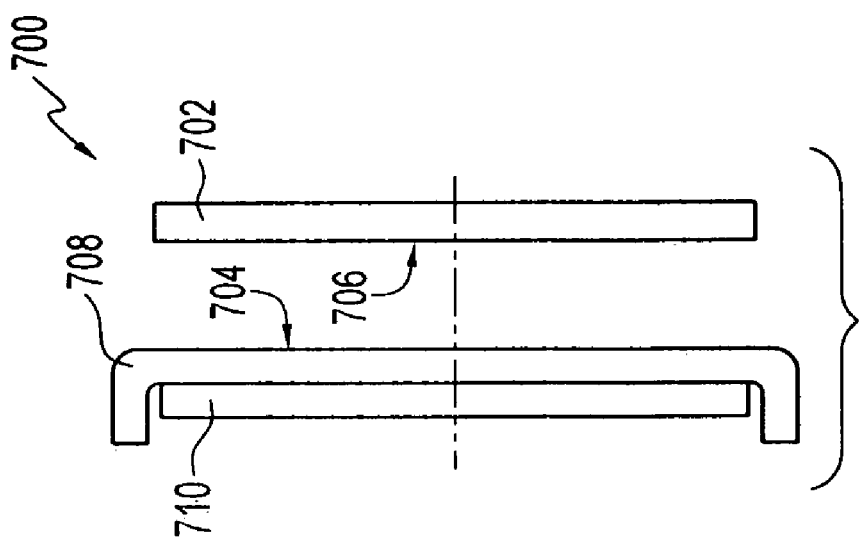
FIG. 7 illustrates a cross-sectional view of a torque sensor system, which can be implemented in accordance with an alternative embodiment.

FIG. 7 illustrates a cross-sectional view of torque sensor system 700, which can be implemented in accordance with an alternative embodiment. Note that the torque sensor system 700 can be adapted for use with the torque sensor systems 100-600 described and illustrated herein with respect to FIGS. 1-6. Note that in system 700, a low friction spacer 708 is depicted. The low friction spacer 708 can be connected to antenna or coupler 710. Low friction spacer 708 can include a surface 704, which is in contact with a surface 706 of another coupler 702. Surface 704 of low friction spacer 708 can be surface coated or configured from a low friction material. Surfaces 704 and 706 are generally in contact with one another. Both couplers 710 and 702 may be stationary or rotating, depending upon design considerations. Low friction spacer 708 generally functions as a low friction spacer that sets a gap between the stationary and/or the rotating couplers, such as, for example couplers 710 and/or 702.

The low friction spacer 708 can be configured as a bearing or in the shape of a solid disc of material that is connected to either support a housing of a rotor or a stator and that fills the entire space between two couplers, such as, couplers 710 and 702. The bearing or spacer 708 may also be configured to fill a part of the space between couplers 710 and 702 so that it does not interfere with the coupling between two traces (not shown in FIG. 7) located in each coupler 710, 702.

In an alternative embodiment, the spacer 708 can be utilized to indirectly set the gap between the coupler traces by providing a spacer between the two support housings of the stator and the rotor couplers. In some situations in which the medium between the couplers may change in the application (e.g., air bubbles in transmission oil, water splashes in flex plate, etc), a solid spacer/bearing can be implemented that fills the entire space between the coupler traces in order to provide a stable dielectric material between the couplers 710 and 702.

The low friction spacer 708 is considered "frictionless" or of such a low friction because the gap does not change significantly over time. Note that a mounting system can be optionally provided that includes a mechanism for pushing the rotating and the stationary structures together against the spacer/bearing 708. Such a mechanism can be provided in the form of a spring on the mounting screws or in the form of plastic features of the coupler support housing that act as springs to force the structures together.

It can be appreciated that torque sensing is often required in automotive applications to provide direct torque measurements to engine or transmission control units. The torque sensor systems 100-600 can therefore be modified to include wireless components for the wireless transmission of torque sensing data, based on a transducer attached to a torque member, such as, for example, torque member 106. The transducers or sensing elements discussed earlier can be attached to an antenna or coupler, such as, for example, couplers 710 and/or 702. A stationary antenna or coupler can be located a short distance from a rotating coupler (e.g., approximately 1.00 mm). The distance between the two couplers 710, 702 is critical to the performance of a wireless torque sensor system. To help reduce the tolerance stack-up between the two couplers 710, 702, one coupler can be placed in contact with a flat surface. Because one of the couplers rotates while the other may not, this flat surface (i.e., surface 704 can be coated with a near frictionless material.

Figure 8:
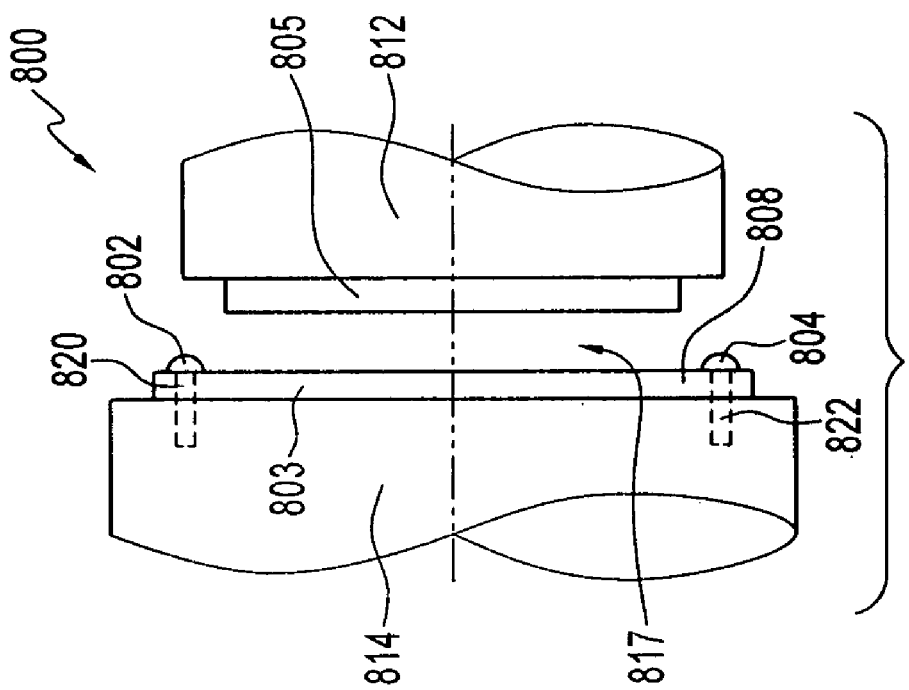
FIG. 8 illustrates a cross-sectional view of a torque sensor system, which can be implemented in accordance with an alternative embodiment.

FIG. 8 illustrates a cross-sectional view of torque sensor system 800, which can be implemented in accordance with an alternative embodiment. Note that the torque sensor system 800 is analogous to torque sensor system 700, but includes variations thereof. For example, system 800 includes two couplers 803, 805, which are respectively analogous to couplers 710, 702 depicted in FIG. 8. One or more fasteners 802, 804 can be utilized to connect coupler 803 to a vehicle member 814. Fasteners 802, 804 can be provided as, for example, connecting mechanisms such as screws or rivets. Coupler 805 is generally connected to a vehicle member 812 and a gap 817 is located between coupler 803 and coupler 805.

Note that stationary coupler/electronics must be securely fastened in order to minimize vibration, stress, and to maintain the air gap 817 constant between itself and the rotating coupler. Fasteners 802, 804 can thus be utilized to maintain the stationary piece (i.e., coupler 803) to some part of a vehicle, such as, for example vehicle portion 814. In the configuration depicted in FIG. 8, the coupler 803 and/or 805 can be implemented in the context of a Printed Circuit Board (PCB) or an impregnated plastic component with holes 820, 822 in the PCB or the impregnated plastic component through which the fasteners 802, 804 can be driven into the vehicle portion or torque member 814 to secure the coupler 803 to the torque member 814. The fasteners 802, 804 can be provided with an epoxy on the threads of the fasteners 802, 804 to help secure the fasteners 802, 804 to the torque member or vehicle portion 814, depending upon design considerations.

Figure 9:
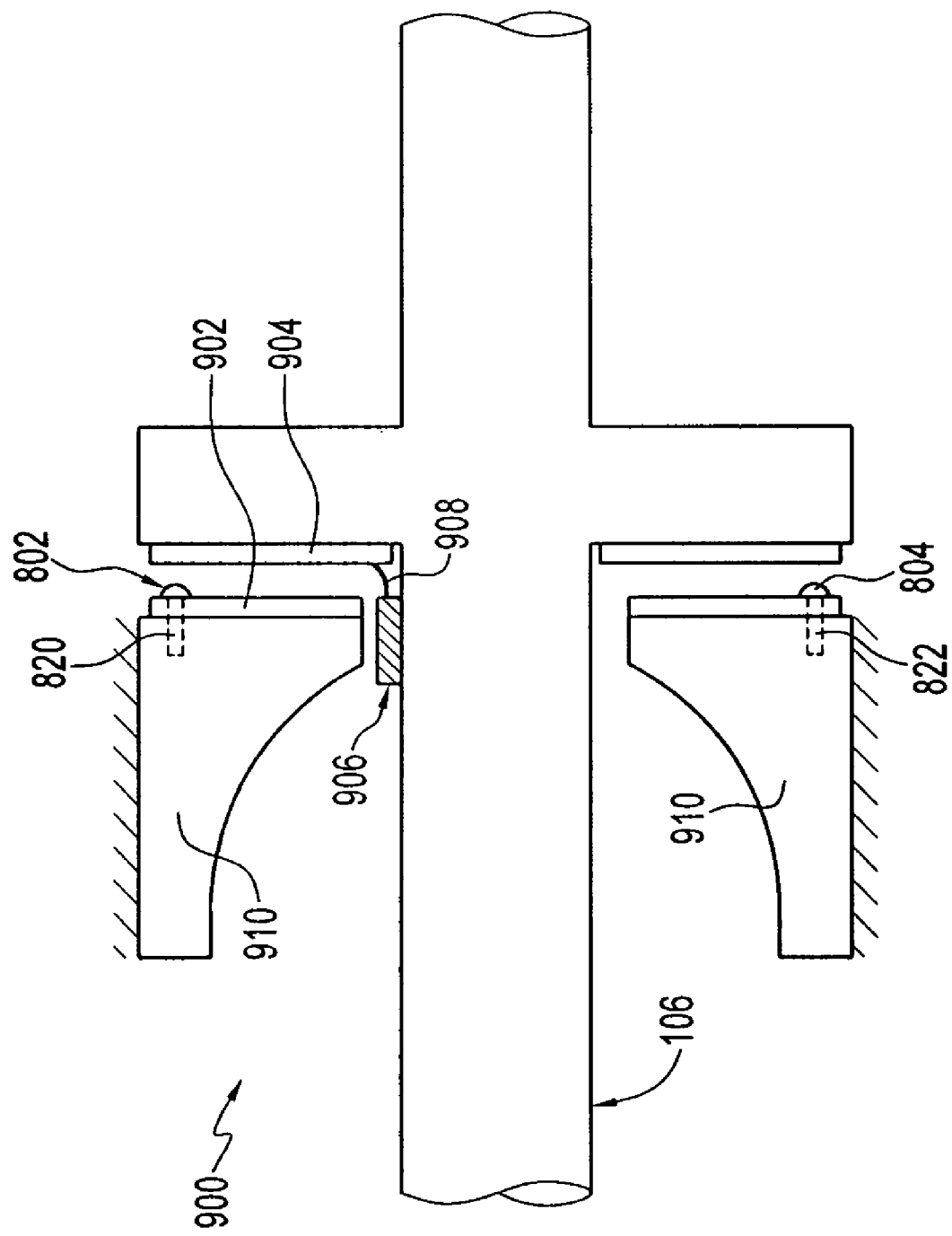
FIG. 9 illustrates a cross-sectional view of a torque sensor system, which can be implemented in accordance with an alternative embodiment.

FIG. 9 illustrates a cross-sectional view of torque sensor system 900, which can be implemented in accordance with an alternative embodiment. Note that torque sensor system 900 Is similar to the torque sensor system 800 illustrated in FIG. 8, with some variations in structure and sensor elements. The rotating member 106 described earlier can be modified and adapted for use in accordance with system 900. A transducer package 906 can be connected to the rotating member 106 according to any one of the connection configurations described earlier herein. A rotating coupler 904 is disposed generally opposite a stationary coupler 902. Note that couplers 902, 904 are analogous to couplers 803, 805 depicted in FIG. 8 and couplers 710, 802 depicted in FIG. 7. Fasteners 802, 804 can be respectively driven through holes 820, 822 in order to connect the stationary coupler 902 to a vehicle member or vehicle portion 910. The rotating torque member 106 is disposed within or surrounded by vehicle portion 910. The rotating coupler 904 can be connected directly to the rotating member 106 and communicates electrically with the transducer package 906 via an electrical connection 908.

Figure 10:
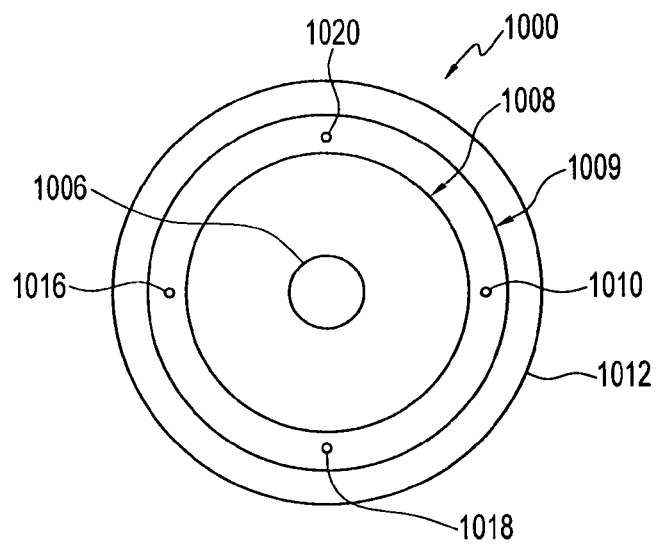
FIG. 10 illustrates a top view of a torque sensor system, which can be implemented in accordance with an alternative embodiment.
Figure 11:
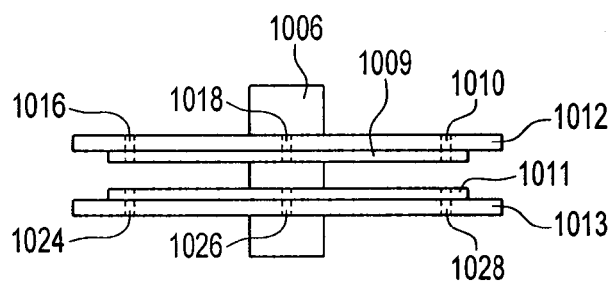
FIG. 11 illustrates a side view of the torque sensor system depicted in FIG. 10 in accordance with an alternative embodiment.
Figure 12:
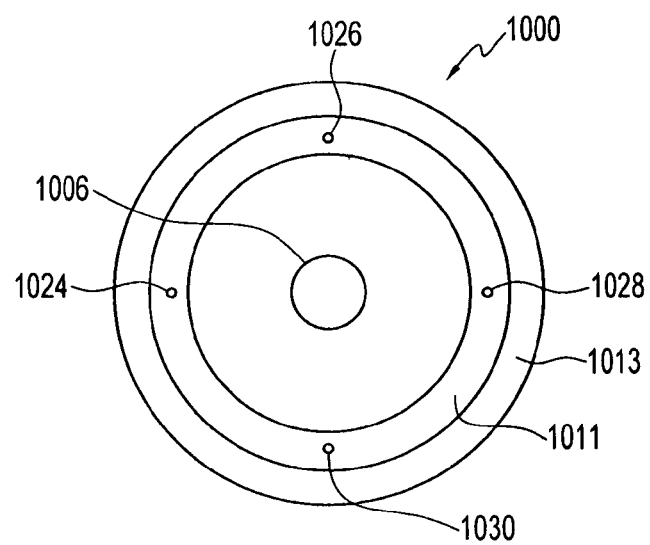
FIG. 12 illustrates a bottom view of the torque sensor system depicted in FIGS. 10-11 in accordance with an alternative embodiment.

FIG. 10 illustrates a top view of a torque sensor system 1000, which can be implemented in accordance with an alternative embodiment. Likewise, FIG. 11 illustrates a side view of the torque sensor system 1000 depicted in FIG. 10 in accordance with an alternative embodiment. Similarly FIG. 12 illustrates a bottom view of the torque sensor system 1000 depicted in FIGS. 10-11 in accordance with an alternative embodiment. Note that in FIGS. 10-11, identical or similar parts or elements are indicated generally by identical reference numerals.

In general torque sensor system 1000 includes a full disk 1012 fastened to a coupler 1009 and a full disk 1013 fastened to a coupler 1011. The full disk 1012 can protect and/or maintaining a coupler conductive trace 1008 associated with a coupler 1009. The full disk 1012 and the coupler 1009 can be connected together utilizing mounting fasteners 1016, 1018, 1010 and 1020. Torque sensor system 1000 includes a centrally located shaft 1006, which is similar torque member 106 described earlier. Such a shaft 1006 can be subject to a torque such as torque 118, also discussed earlier. Torque sensor system 100 further includes a coupler 1011, which is associated with and/or connected to the full disk 1013. Note that the full disk 1013 can be connected to the coupler 1011 by mounting fasteners 1024, 1026, 1028 and 1030. Note that coupler 1011 can be configured from a low friction bearing material and can be shaped, for example, as a disk that fills the entire gap space between couplers 1011 and 1009. Note that in general, however, the full disks 1012, 1013 can act as a bearing surface.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque sensor packaging system, comprising:
   a torque member comprising a blind hole wherein the blind hole is a concave cavity within the torque member having an open top, a closed bottom, and a single continuous sidewall between the top and the bottom; and
   a sensing element comprising a SAW die and inside said blind hole and fixedly attached to said torque member in order to transfer a torque associated with said torque member to said sensing element for torque sensing operations;
   wherein said sensing element is associated with a coupler for the wireless transmission of data from said sensing element, wherein said coupler comprises a PCB or an impregnated plastic component that includes a plurality of holes through which a plurality of respective fasteners are driven into said torque member.

2. The system of claim 1 wherein said sensing element comprises a transducer.

3. The system of claim 1 further comprising a torque sensor package integrated with said sensing element, wherein said torque sensor package is configured to include at least one hole for receiving at least one fastener for connection of said torque sensor package to said torque member.

4. The system of claim 3 wherein said at least one fastener comprises a plurality of rivets for connecting said torque sensor package to said torque member through at least one hole.

5. The system of claim 3 wherein said at least one fastener comprises a plurality of screws for connecting said torque sensor package to said torque member through at least one hole.

6. The system of claim 1 further comprising:
   a torque sensor package comprising a flange and connected to said sensor element; and
   wherein an adhesive secures said flange to said torque member.

7. The system of claim 1:
   wherein said SAW die generates an electrical output that is proportional to said torque induced on said torque member; and
   wherein an adhesive secures said SAW die directly to said torque member.

8. The system of claim 1 further comprising:
   a metal patch covering said sensing element.

9. The system of claim 1 further comprising a transducer package for maintaining said sensing element, wherein said transducer package comprises a ½ button transducer package cover that maintains said transducer within said blind hole.

10. The system of claim 1 further comprising a low friction spacer, wherein said low friction spacer comprises a low friction surface, wherein said low friction spacer sets a consistent gap between a first and a second coupler associated with said torque sensor packaging system.

* * * * *